United States Patent [19]

Kohmann

[11] Patent Number: 4,946,430
[45] Date of Patent: Aug. 7, 1990

[54] APPARATUS AND METHOD FOR FORMING AT LEAST ONE FOLD LINE IN A SUBSTANTIALLY RIGID PLASTIC MATERIAL

[75] Inventor: Karl-Heinz Kohmann, Mettmann, Fed. Rep. of Germany

[73] Assignee: Kohmann GmbH & Co. KG Maschinenbau, Fed. Rep. of Germany

[21] Appl. No.: 265,754

[22] Filed: Nov. 1, 1988

[30] Foreign Application Priority Data

Nov. 7, 1987 [DE] Fed. Rep. of Germany ....... 3737968

[51] Int. Cl.$^5$ .................. B31B 1/25; B31B 1/62; B31B 1/82; B31B 1/88
[52] U.S. Cl. .................... 493/58; 264/280; 264/293; 425/385; 425/383; 156/219; 156/252; 156/299; 156/553; 156/555; 156/556; 493/63; 493/67; 493/131; 493/93; 493/94; 493/95; 493/96; 493/97; 493/348; 493/355; 493/403; 493/905
[58] Field of Search .............. 493/58, 60, 61, 62, 493/63, 67, 102, 131, 132, 345, 348, 355, 396, 402, 403, 405, 84, 85, 89, 93–97, 99, 110; 264/280, 293; 425/385, 383; 156/219, 252, 299, 555, 553, 556

[56] References Cited

U.S. PATENT DOCUMENTS

| | | | |
|---|---|---|---|
| 3,199,670 | 8/1965 | Palmer | 206/206 |
| 3,292,513 | 12/1966 | Palmer | 93/58 |
| 3,379,814 | 4/1968 | Bracey, Jr. | 493/396 |
| 4,179,252 | 12/1979 | Seufert | 425/174.6 |
| 4,211,743 | 7/1980 | Nauta et al. | 425/385 |
| 4,460,431 | 7/1984 | Keller et al. | 493/205 |
| 4,547,141 | 10/1985 | Ruschmann | 425/385 |
| 4,664,648 | 6/1987 | Dupuy | 493/84 |
| 4,713,046 | 12/1987 | Dupuy | 493/6 |

FOREIGN PATENT DOCUMENTS

| | | |
|---|---|---|
| 2541324 | 3/1977 | Fed. Rep. of Germany . |
| 3210967 | 7/1985 | Fed. Rep. of Germany . |
| 3148443 | 5/1986 | Fed. Rep. of Germany . |

Primary Examiner—Frederick R. Schmidt
Assistant Examiner—Jack Lavinder
Attorney, Agent, or Firm—Lerner, David, Littenberg, Krumholz & Mentlik

[57] ABSTRACT

An apparatus and associated method for embossing at least one fold line in a substantially rigid plastic material for use in collapsible folding box with angle windows is disclosed, and the apparatus has a roll of plastic material, a heating zone for heating a length of the roll fed plastic material, an embossing zone located downstream of the heating zone for forming at least one fold line in the heated plastic material, a punching zone for intermittently forming cutout portions in the plastic material, a takeup device for creating a variable length slack in the plastic material for providing the continuous movement of the plastic material through the heating zone and the embossing zone and the intermittent movement of the plastic material through the punching zone, a cross-cutter to cut the plastic material at the punched holes, a suction roll to convey the cut plastic material for connection to a glue-coated cardboard box blank.

45 Claims, 2 Drawing Sheets

APPARATUS AND METHOD FOR FORMING AT LEAST ONE FOLD LINE IN A SUBSTANTIALLY RIGID PLASTIC MATERIAL

BACKGROUND OF THE INVENTION

The invention relates to a method and apparatus for forming fold lines in substantially hard plastic material.

The use of cooperating embossing and flattening rollers to produce fold lines in substantially flat material is known from U.S. Pat. No. 3,292,513. However, there is no mention therein of heating the sheet blank or the embossing tool. Further, if transparent PVC is embossed using this apparatus, the plastic material in the region of the fold line tends to turn white upon bending of the fold line. In U.S. Pat. No. 4,664,648, the embossing of the grooves that produce the fold lines is done intermittently, the result being a limitation on working speed. Heating can be done to assist in the forming of the grooves, but it is not stated how this is to be done.

German Pat. No. 3,210,967 relates to the manufacture of folding-box blanks from hard PVC sheeting. In this case, the entire folding-box blank consists of transparent PVC sheeting. In the area of the fold lines, the hard PVC sheeting is embossed linearly. To create this embossing, the PVC sheet is first warmed by means of radiant heat directed at the top surface of the sheet; then, just before embossing the grooves that create the fold lines, the sheet is moved along a flow of heating gas aimed at the top surface of the sheet, and its entire surface is heated to a temperature below the melting temperature of the PVC material. The primary goal is to prevent spring-back of the hard PVC when the box is set up. A great deal of heating is required, which always carries with it the risk that the hard PVC sheeting will become rippled and will no longer provide a clean window.

The heating of the entire area of the PVC sheet is avoided in the process according to U.S. Pat. No. 4,179,252, in which the sheet is heated in the area of the fold line or bend edge by means of high frequency. In practice, however, high-frequency heating is inconvenient, because of the necessary expenditure for insulation and protection against stray fields.

SUMMARY OF THE INVENTION

According to a preferred embodiment of the present invention, the heating of the plastic material is limited in width to the bending or folding area. Also, the path through the heating zone is sufficiently long so that the plastic material has time to become heated enough to permit the formation of a fold line. A fold line is one which can be bent substantially without turning white, i.e. showing any bending whiteness. Preferably, the fold lines formed in accordance with the present invention will permit the manufacture of containers which can be handled by container setup and filling machines substantially without white lines being formed during setup and filling.

Immediately after departure from the heating zone, the heated area of the sheeting material passes between a cold grooving or embossing roller and a cold mating roll, which create in the sheeting a groove or fold line that runs in the direction of movement of the sheeting, in which said groove the thickness of the material is reduced to a certain extent. It has been found that if a sheet blank prepared in such a manner is glued into its folding box blank, and is set up with this folding box blank, fully transparent bend edges can be obtained without a hint of white brittleness. If several bend edges are to be obtained, many heating zones and grooving rollers are positioned accordingly next to one another. In the preferred embodiment, a continuous web is fed from a roll of plastic material. The invention could also be used on individual sheet blanks.

By working with a roll of plastic material, the length of sheeting can be heated, grooved, divided up crosswise, and positioned on the folding-box blank, where the glueing is done, practically in one operation, without interruptions, intermittent heating, or back-and-forth movements. It has been found that by this process according to the invention, greatly increased speed of production can be achieved.

In the preferred embodiment, the heating equipment consists of heating bars adjacent to the sheet blank, which heating bars can be heated to the desired temperature by means of longitudinally positioned, electrical heating elements running along them lengthwise. The length of the heating bars, together with the forward-feed speed of the sheet material, determine the period during which the sheet area that is to be grooved is subjected to heat. To prevent warping of the sheets, the area of warming should be limited chiefly to the area where the grooves are to be formed.

To prevent the heating bars adjacent to the sheeting from adhering to the sheeting and damaging its surface, if the sheeting softens progressively, the heating bars can be coated with a heat-resistant substantially frictionless sheet made, for example, from polytetrafluorethylene or similar material.

DESCRIPTION OF THE DRAWINGS

In order that the invention may be fully understood, it will now be described with reference to the accompanying drawings, in which.

DESCRIPTION OF THE INVENTION

Figure 1:
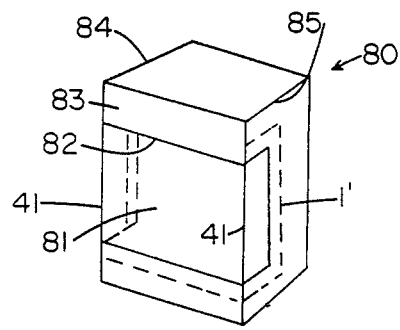
FIG. 1 is a perspective view of a collapsible folding box with a window.

FIG. 1 shows a collapsible folding cardboard box 80 with a transparent angle window 81, which consists of a sheet blank 1' of the type to be manufactured. Folding box 80 is cuboid, and has in the forward portion 83 and the two adjacent and opposing sides 84, 85 a cutout 82, which is covered over by sheet blank 1' glued inside folding bóx 80 Folding box or container 80 can also be made of a material other than cardboard or paperboard, e.g. corrugated paper. Also, cutout 82 can be shaped differently, and instead of being rectangular the horizontal projection can be, for example, triangular or sexangular, so that other bend angles appear in the bend edges or fold lines 41.

Since sheet blank 1' extends over the front 83 as well as the two sides 84, 85, it has fold lines 41 angled at 90°. Since the fold lines 41 are directly within the field of vision, they must be shaped as perfectly as possible, and in particular they must be free of bending whiteness. To prepare the bend edges 41, grooves 31 (FIG. 6) are created in the flat sheet blank 1' by the apparatus designated 50 and placed in window glueing machine 100 (FIG. 5).

Figure 2:
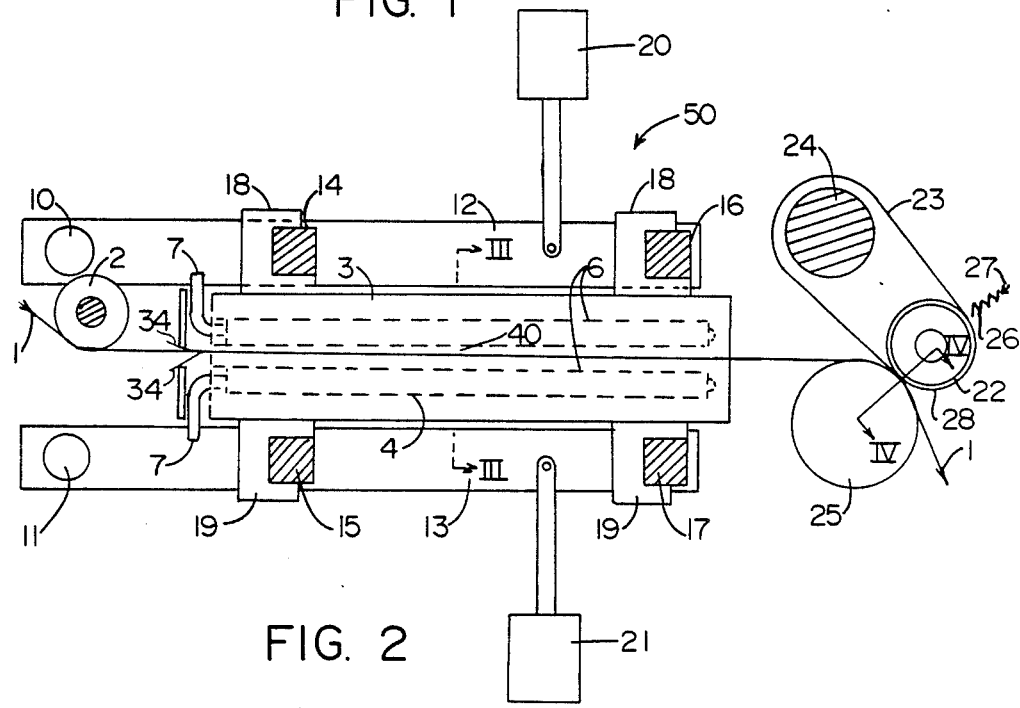
FIG. 2 is a schematic side view of the equipment for creating in the sheeting a groove that produces a fold line or bend edge in accordance with the present invention.
Figure 5:
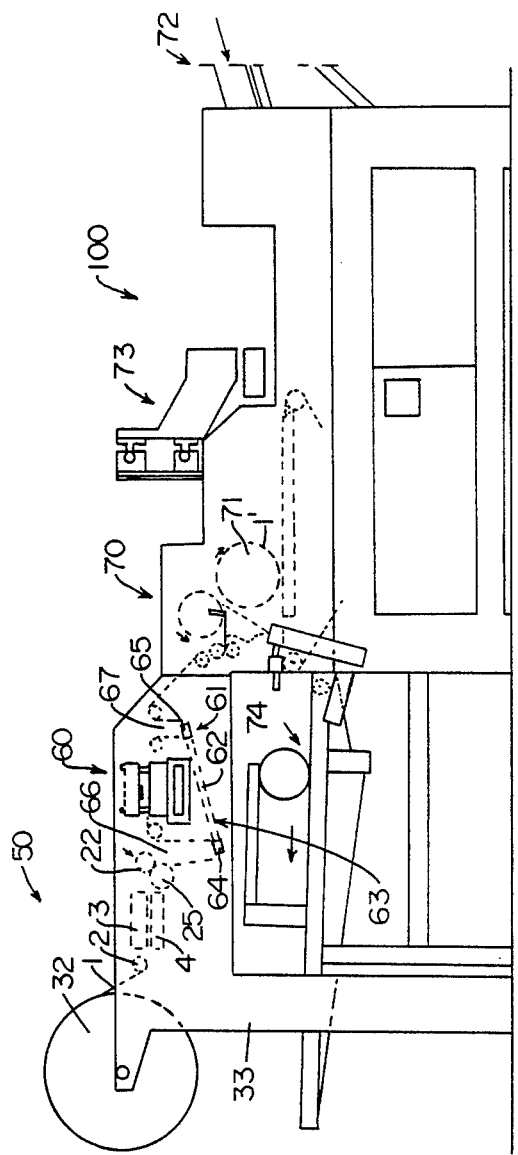
FIG. 5 is a schematic side-view of a complete window glueing machine in which the equipment component according to FIG. 2 is inserted.
Figure 6:
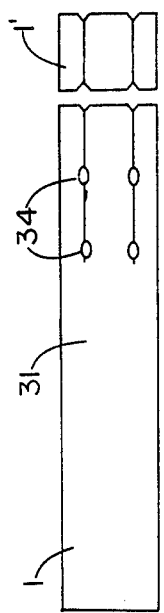
FIG. 6 is a top plan view of a length of sheeting in the work phase reached in the window-glueing machine of FIG. 5.

The apparatus designated overall by the number 50 in FIG. 2 processes a web 1 out of a fairly stiff, plasticizer-free hard PVC approximately 0.3 mm thick, which is drawn off a roll not shown in FIG. 2 but shown as number 32 in FIG. 5. The web 1 is moved under a roller 2 between a pair of heating bars, 3, 4, which in the embodiment are 36 cm long. There are as many pairs of heating bars 3, 4 as there are grooves 31 to be created in sheet web 1 for the formation of bend edges 41.

Figure 3:
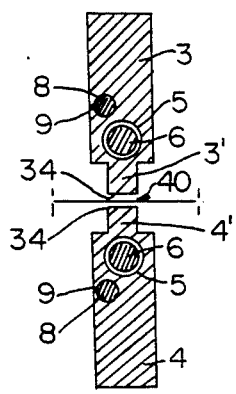
FIG. 3 is a cross-section through the heating bars taken on Line III—II in FIG. 2.

The cross-section of the heating bars 3, 4 can be seen in FIG. 3. Each is essentially rectangular, with a narrow foot 3' or 4' protruding from a narrow edge. The feet 3', 4' of the heating bars 3, 4 face each other.

In the vicinity of the feet 3', 4', heating bars 3, 4 have longitudinal channels 5, in which rod-shaped electrical heating elements 6 are positioned, which said heating elements 6 extend along essentially the entire length of heating bars 3, 4 and are connected to electrical feed lines 7. In addition, there are longitudinal channels 8 containing temperature measurement components 9, by means of which the temperature of heating bars 3, 4 can be adjusted precisely. The appropriate temperature depends on the material and thickness of web and of the speed of advancement. In the example mentioned with a web of hard PVC of 0.3 mm thickness, a length of the heating bars of 36 cm and a speed of 30 meters per minute, the temperature of the heating bars was 84° C.

Above and below sheet web 1, which moves roughly longitudinally and horizontally past heating bars 3, 4, there are transverse shafts 10, 11 between the side walls of the machine housing. The shafts 10, 11 are positioned before the entry of sheet web 1 between heating bars 3, 4. Arms 12, 13 extend out horizontally from said shafts 10, 11, in the direction of movement of sheet web 1, on both sides. The arms 12, 13 are connected by means of square bars 14, 15 or 16, 17, which are spaced from each other in the direction of movement of sheet web 1. On the back of heating bars 3, 4 there are U-shaped attachment elements 18, 19, which are open in the direction of movement of sheet length 1, and which can accept the insertion of square bars 14, 15, 16, 17 as per FIG. 2. In this manner, heating bars 3, 4 can be easily positioned and adjusted crosswise to sheet web 1, with attachment to square bars 14, 15, 16, 17 by means of locking screws. Arms 12, 13 can be pivoted on shafts 10, 11 by means of pneumatic cylinders 20, 21 in order to allow insertion of web 1.

Immediately downstream from the end of heating bars 3, 4, on the right in FIG. 2 is an embossing roller 22 in the plane formed by heating bars 3, 4, which embossing roller 22 can be pivoted by a lever 23 around a shaft 24 extending crosswise between the side walls of the machine housing. The pivoting continues until embossing roller 22 engages a smooth mating roller 25 that extends across the width of sheet web 1. By the swinging of lever 23, grooved or embossing roller 22 can be pressed down, with adjustable force, against the top of sheet web 1, which is supported from underneath by smooth mating roller 25, as schematically indicated by spring 26 and arrow 27. Of course, embossing means other than a roller could be employed in variations of the disclosed preferred embodiment.

Figure 4:
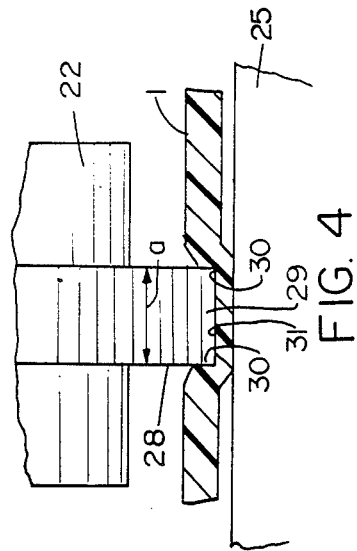
FIG. 4 is a partial cross-section taken on Line IV—IV in FIG. 2.

The construction of embossing roller 22 is shown in detail in FIG. 4. It is an essentially cylindrical roller with a circumferential rib 28 having a cylindrical circumferential portion 29 with rounded corners 30 to prevent cutting. The circumferential rib 28 forms the actual grooving or embossing tool. Width "a" of circumferential rib 28 can vary from, for example, 0.5 to 3.0 mm, depending on the sheeting to be processed.

In operation, sheet web 1 is unwound from the roller and is led between heating bars 3, 4 without prior heating. It then passes through heating zone 40, which is as long as heating bars 3, 4 and as wide as feet 3', 4'. Sheet web 1 requires a certain time in order to pass through heating zone 40, during which time a specific segment in the heating zone 40 is subjected to temperature. At the end of heating zone 40, the area that is to be imprinted with a groove has been sufficiently heated. One can determine when this has been achieved by checking to see that the resultant fold lines do not show any whiteness in the flat state of the sheet, and it is otherwise in good condition. Thus, there may be some initial trials to achieve the proper setup for each run. The temperature in the heating zone 40 and the time of travel of the plastic sheet or length 1 through the heating zone 40 must further be varied until one obtains a fold line which does not turn white upon being bent about 90°, for example.

After sheet web 1 leaves heating bars 3, 4, the heated area immediately passes between grooved roller 22 and its mating roller 25, both of which are unheated. Under the effect of elastic engagement force 26, 27, a deformation is created in the sheet web 1 approximately in the manner shown in FIG. 4. The circumferential rib 28 forming the grooving tool penetrates the length of sheeting and, in the area of the cylindrical circumferential portion 29, decreases the thickness of the sheeting by approximately one-half, i.e. to about 0.15 mm in the case of a 0.3 mm sheeting. The sheeting next to circumferential rib 28 rises slightly from the smooth mating roller 25, in the manner shown in FIG. 4, so that an approximately trough-shaped groove 31 is created, with the inside of the groove forming the outer bend side when the folding box is set up.

Through the collaboration of the long heating zone 40, the width of which does not essentially exceed the width of the groove 31 to be created, and the cold embossing tools 22, 25, a grooved sheeting can be produced that is completely even outside the grooves and permits a forming of the bend edges 41 (FIG. 1) that is completely free of bending whiteness. Further, greatly increased speeds of production are possible FIG. 5 shows a window glueing machine, designated overall by the number 100, in which said machine the equipment component 50 of FIGS. 2 to 4 is integrated. Roll 32 is supported in the machine housing, which is indicated by the number 33 Only the forward side wall of said machine housing 33 can be seen in the drawing. Sheet web 1 passes through equipment component 50, and after the longitudinal grooves 31 (FIG. 6) are created, sheet web 1 reaches a punching station 60, in which diamond-shaped cutouts 34 are created in the sheet length, said cutouts being needed upon bending of the bend edges in the cardboard blank in order to prevent excessive tensions in the material, which at that point is doubled due to the juxtaposition of the cardboard and plastic sheets.

The punching station 60 works intermittently. The transport of sheet web 1 before and behind punching station 60 continues uniformly. To compensate for these differing movements, a compensator 61 is provided. The compensator 61 consists of a rocker 63 pivotable around a center pivot point 62. Rollers 64, 65 are housed on the free ends of said rocker 63. The rollers 64, 65 form variable loops 66, 67 in sheet length 1, which said loops 66, 67 hold the continuing lengths while sheet length 1 is halted in the punching station 60.

After the diamond-shaped holes 34 have been punched, sheet length 1 proceeds to a cross-cutter 70, in which sheet length 1 is divided along holes 34, so that sheet lengths 1' of the type shown in FIG. 5 are created. These sheet lengths 1' are conveyed by a suction roll 71 in precise relation to the glue-coated cardboard blanks, which are fed in at 72 and are coated with glue in the glue station 73. The finished folding box blanks are conveyed away at 74.

While the foregoing description and figures illustrate a preferred embodiment of the present invention, it should be appreciated that modifications and variations may be made in the disclosed apparatus and method without departing from the spirit and scope of the invention. Thus, it is intended that the invention be defined by the claims set forth immediately hereinafter.

What is claimed:

1. Apparatus for embossing at least one fold line in a length of substantially rigid plastic material moving along a path, comprising heating means defining a heating zone extending lengthwise of the path and in which at least one portion of the width of the length of plastic material, which in total is less than the whole width, is heated to facilitate the formation of a fold line in the heated portion, first feeding means for moving at least that portion of the plastic material which is to be embossed to form a fold line into said heating zone, embossing means positioned downstream of said heating zone along the path for forming at least one fold line in the heated portion of the plastic material, and second feeding means for moving the plastic material from said heating zone to said embossing means while the heated portion of the material is still sufficiently heated to enable said embossing means to form the at least one fold line in said plastic material.

2. The apparatus according to claim 1, wherein the heating zone is adapted to heat at least two portions of the width of the length of plastic material.

3. Apparatus according to claim 1, wherein the width of the heated portion of the length of plastic material does not substantially exceed the width of the fold line to be formed.

4. Apparatus according to claim 1, wherein said heating means is so constructed that it applies heat to both sides of a length of plastic material disposed therein.

5. Apparatus according to claims 1 or 4, wherein said first feeding means includes means for supporting a roll of plastic material and roller means for moving a length of plastic material from said roll to and through said heating zone.

6. Apparatus according to claims 1 or 4, wherein said embossing means comprises unheated embossing means.

7. Apparatus according to claim 6, in combination with punching means for intermittently forming cutout portions in the plastic material, wherein said first and second feeding means comprise means for supporting a roll of plastic material and means for feeding a length of plastic material from said roll to and through said heating zone and to and through said punching means; and take-up means for creating a variable length slack in the fed length of the plastic material to provide for continuous movement of the plastic material through said heating zone and said embossing means for intermittent movement of the plastic material through said punching means.

8. Apparatus according to claim 6, wherein the width of the heated portion of the length of plastic material does not substantially exceed the width of the fold line to be formed.

9. Apparatus according to claims 1 or 4, wherein said embossing means comprises unheated cooperating rollers.

10. Apparatus according to claims 1 or 4, wherein said embossing means comprises an embossing roller and a cooperating flat roller.

11. Apparatus according to claim 1 or 4, in combination with punching means for intermittently forming cutout portions in the plastic material, wherein said first and second feeding means comprise means for supporting a roll of plastic material and means for feeding a length of plastic material from said roll to and through said heating zone and to and through said punching means; and take-up means for creating a variable length slack in the fed length of plastic material to provide for continuous movement of the plastic material through said heating zone and said embossing means for intermittent movement of the plastic material through said punching means.

12. Apparatus according to claims 1 or 4, wherein said heating means comprises heating bars and each said heating bar is from about 300 to 500 mm long and from about 3 to 8 mm wide.

13. Apparatus according to claims 1 or 4, wherein the said heating means comprises heating bars adapted to support the plastic material as it moves through the said heating zone, and wherein at least a portion of the said heating bars are coated with a heat-resistant substantially frictionless material.

14. Apparatus according to claims 1 or 4, wherein the said heating means comprises heating bars adapted to support the plastic material as it moves through the said heating zone, and wherein at least a portion of the said heating bars are coated with polytetrafluorethylene.

15. Apparatus according to claims 1 or 4, wherein said rigid plastic material is disposed on a roll, and said first and second feeding means include means for supporting said roll and means for drawing material from said roll to and through said heating zone and said embossing means.

16. A machine for making composite containers formed from at least two different sheets of material of which at least one sheet is a substantially rigid plastic material, including:

a. apparatus for embossing at least one fold line in a length of substantially rigid plastic material comprising heating means defining a heating zone in which at least one a portion of the width of the length of plastic material, which in total is less than the whole width, is heated to facilitate the formation of a fold line in the heated portion, first feeding means for moving at least that portion of the plastic material which is to be embossed to form a fold line into said heating zone, embossing means positioned outside of said heating zone for forming at least one fold line in the heated portion of the plastic material, and second feeding means for moving the plastic material from said heating zone to said embossing means while the heated portion of the material is still sufficiently heated to enable said embossing means to form the at least one fold line in said plastic material;

b. means for feeding sheets of a second material to a position in which a sheet of the second material is juxtaposed with a sheet of the plastic material; and c. means for adhering the juxtaposed sheets together to form at least a portion of a container blank.

17. A machine according to claim 16, wherein said embossing means are unheated.

18. A machine according to claim 17, wherein the width of the heated portion of plastic material does not substantially exceed the width of the fold line to be formed.

19. A machine according to claim 16, wherein the width of the heated portion of plastic material does not substantially exceed the width of the fold line to be formed.

20. The machine according to claim 16, wherein the heating zone is adapted to heat at least two portions of the width of the length of plastic material.

21. A machine according to claim 16, further comprising punching means for forming cutout portions in the said plastic material, wherein said first and second feeding means comprise means for supporting a roll of plastic material and means for feeding a length of plastic material from said roll to and through said heating zone and to and through said punching means, and said apparatus further comprises takeup means for creating a variable length slack in the fed length of plastic material to provide for continuous movement of the plastic material through said heating zone and intermittent movement of the plastic material through said punching means.

22. A machine according to claim 21, wherein said first feeding means includes means for supporting a roll of plastic material, and said machine further comprises means for cutting the embossed plastic material into sheets of plastic material.

23. A machine according to any one of claims 16, 21, or 22 wherein said heating means is so constructed that it applies heat to both sides of a length of plastic material disposed therein.

24. A method of making folding box blanks comprising the steps of moving a length of substantially rigid plastic material into a heating at least one zone, heating portion of the length of the plastic material which is to be embossed, said heated portion being less than the whole width of the plastic material, moving the heated plastic material from the heating zone to an embossing means, embossing at least one fold line in the heated portion of the plastic material, intermittently punching cutout portions in the plastic material, cutting the embossed and punched plastic material at said cutout portions, fastening the cut plastic material to a cardboard box blank having a cutout and at least one fold line so as to cover said cutout and so that said at least one fold line in the plastic material is aligned with at least one fold line of the cardboard box blank.

25. A method according to claim 24, wherein the step of heating the plastic material in the heating zone comprises heating both sides of the plastic material.

26. A method according to claim 24, wherein the embossing step comprises embossing the heated plastic material with cooperating unheated rollers while the material is moved through the rollers.

27. A method according to claim 26, wherein the heating of a portion or portions of a length of the plastic material is accomplished such that the width of the heated portion or portions does not substantially exceed the width of the fold line to be formed therein.

28. A method according to claim 24, wherein the heating of a portion or portions of a length of the plastic material is accomplished such that the width of the heated portion or portions does not substantially exceed the width of the fold line to be formed therein.

29. The method according to claim 24, wherein at least two portions of the length of the plastic material are heated.

30. A method of embossing at least one fold line in a length of substantially rigid plastic material, comprising the steps of moving the plastic material into a heating at least one zone, heating portion of a length of the plastic material which is to be embossed to form a fold line in the heated portion, said heated portion being less than the whole width of the plastic material, moving the plastic material from the heating zone to embossing means, and an embossing at least one fold line in the heated portion of the plastic material while it is still sufficiently heated to enable the embossing means to form said at least one fold line therein.

31. A method according to claim 30, wherein the embossing step comprises embossing the heated plastic material with unheated embossing means.

32. A method according to claim 31, wherein the heating step comprises heating a portion of a length of the plastic material such that the width of the heated portion or portions does not substantially exceed the width of the fold line to be formed therein.

33. A method according to claim 30, wherein the step of heating the plastic material in the heating zone comprises heating both sides of the plastic material.

34. A method according to claims 30 or 33, wherein the embossing step comprises embossing the heated plastic material with cooperating unheated rollers while the material is moved through the rollers.

35. A method according to claims 30 or 33, wherein said plastic material is polyvinylchloride.

36. A method according to claim 30, wherein the heating step comprises heating a portion of a length of the plastic material such that the width of the heated portion or portions does not substantially exceed the width of the fold line to be formed therein.

37. The method according to claim 30, wherein at least two portions of a length of the plastic material are heated.

38. A method for making composite containers formed from at least two different sheets of material of which at least one sheet is a substantially rigid plastic material, comprising:

a. moving the plastic material into a heating zone, heating at least one portion of a length of the plastic material which is to be embossed to form a fold line in the heating zone, said heated portion being less than the whole width of the plastic material, moving the plastic material from the heating zone to an embossing means, and embossing at least one fold line in the heated portion of the plastic material while it is still sufficiently heated to enable the embossing means to form at least one fold line therein;

b. feeding sheets of a second material to a position in which a sheet of the second material is juxtaposed with a sheet of the plastic material; and c. adhering the juxtaposed sheets together to form at least a portion of a container blank.

39. The method according to claim 38, wherein at least two portions of a length of plastic material are heated.

40. A method according to claim 38, wherein the heating step comprises heating a portion of a length of the plastic material such that the width of the heated portion or 41. A method according to claim 38, wherein the embossing step comprises embossing the heated plastic material with unheated embossing means.

42. A method according to claim 41, wherein the heating step comprises heating a portion of a length of the plastic material such that the width of the heated portion or portions does not substantially exceed the width of the fold line to be formed therein. portions does not substantially exceed the width of the fold line to be formed therein.

43. A method according to claim 38, wherein the step of heating the plastic material in the heating zone comprises heating both sides of the plastic material.

44. A method according to claims 38 or 43, wherein the embossing step comprises embossing the heated plastic material with cooperating unheated rollers while the material is moved through the rollers.

45. A method according to claims 38 or 43, wherein said plastic material is polyvinylchloride.

* * * * *

UNITED STATES PATENT AND TRADEMARK OFFICE
CERTIFICATE OF CORRECTION

PATENT NO. : 4,946,430

DATED : August 7, 1990

INVENTOR(S) : Karl-Heinz Kohmann

It is certified that error appears in the above-identified patent and that said Letters Patent is hereby corrected as shown below:

Column 2, Line 46, "III-II" should read --III-III--.

Column 6, Line 62, cancel the word "a".

Column 7, Line 51, cancel "at least one".

Column 7, Line 51, after "heating" (second occurrence) insert --at least one--.

Column 8, Lines 20-21, cancel "at least one"

Column 8, line 21, after "heating" insert --at least one--.

Column 8, Line 25, after "to" insert --an--.

Column 8, Line 26, cancel the word "an".

Column 9, Line 14, after "portion or" insert --portions does not substantially exceed the width of the fold line to be formed therein--.

Column 10, Lines 5-7, cancel "portions does not substantially exceed the width of the fold line to be formed therein".

Signed and Sealed this

Third Day of September, 1991

Attest:

HARRY F. MANBECK, JR.

Attesting Officer

Commissioner of Patents and Trademarks